United States Patent [19]

Gardner

[11] Patent Number: 4,975,399
[45] Date of Patent: Dec. 4, 1990

[54] REGENERATION OF HYDROTREATING CATALYST

[75] Inventor: Lloyd E. Gardner, Bartlesville, Okla.

[73] Assignee: Phillips Petroleum Company

[21] Appl. No.: 274,114

[22] Filed: Nov. 21, 1988

[51] Int. Cl.$^5$ .................. B01J 20/20; B01J 23/94; B01J 23/92; B01J 23/88

[52] U.S. Cl. .................. 502/38; 208/216 R; 208/251 H; 502/49; 502/52; 502/56

[58] Field of Search .................. 502/49, 52, 45–48, 502/220, 314, 516, 517.8, 31, 38, 56

[56] References Cited

U.S. PATENT DOCUMENTS

| | | | |
|---|---|---|---|
| 2,924,568 | 2/1960 | Anderson, Jr. et al. | 208/216 |
| 2,963,444 | 12/1960 | Nixon | 252/416 |
| 3,751,379 | 8/1973 | Hayes | 252/415 |
| 4,007,131 | 2/1977 | Gillespie et al. | 502/52 |
| 4,026,821 | 5/1977 | Schoofs et al. | 502/48 |
| 4,152,291 | 5/1979 | Drake | 252/416 |
| 4,425,255 | 1/1984 | Toyoda et al. | 502/38 |
| 4,657,663 | 4/1987 | Gardner et al. | 502/314 |
| 4,767,523 | 8/1988 | Kukes et al. | 502/8 |

OTHER PUBLICATIONS

"Regeneration of Hydrotreating Catalysts", by Joseph F. Martin, Ketjen Catalysts, Fall 1984.

Primary Examiner—Paul E. Konopka

[57] ABSTRACT

A spent hydrotreating catalyst composition is regenerated by a two-step heating process under such conditions as to substantially remove all carbonaceous deposits therefrom and to increase the average pore diameter of the catalyst composition. The thus-prepared regenerated catalyst composition is employed in a process for hydrotreating metal-containing oils.

30 Claims, 1 Drawing Sheet

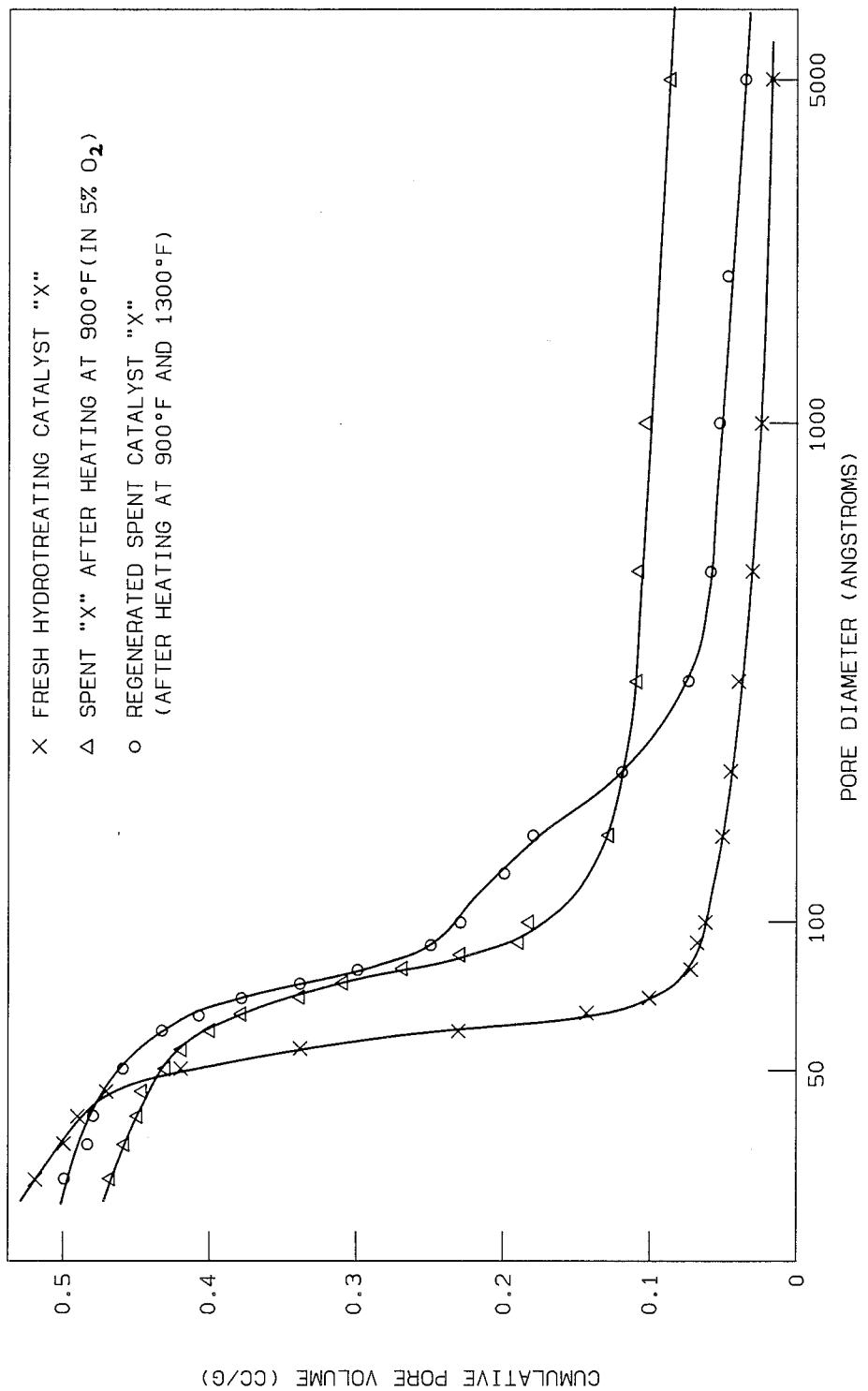

REGENERATION OF HYDROTREATING CATALYST

BACKGROUND OF THE INVENTION

This invention relates to a method of regenerating a spent hydrotreating catalyst. In another aspect, this invention relates to an oil hydrotreating process employing a regenerated hydrotreating catalyst.

Commercial refining processes use large quantities of solid hydrotreating catalysts for upgrading crude oils and crude oil fractions. These catalysts become ineffective after extensive periods of time on stream, mainly due to coke and metal deposits, clogging of pores, poisoning of active sites, and the like. Generally these spent catalyst are discarded. This method results in disposal expenses, environmental problems (due to possible leaking of contaminants from the catalyst into the soil) and high catalyst replacement costs. Thus, there is an ever present need to find ways to regenerate and reuse spent hydrotreating catalysts rather than discarding them.

SUMMARY OF THE INVENTION

It is an object of this invention to regenerate a spent hydrotreating catalyst. It is another object of this invention to provide a regenerated hydrotreating catalyst being effective as a hydrodemetallization catalyst. It is another object of this invention to provide a process for hydrotreating a metal-containing oil employing a regenerated hydrotreating catalyst. Other objects and advantages will become apparent from the described description and the appended claims.

In accordance with this invention, a process for regenerating a spent hydrotreating catalyst composition comprises the steps of:

(a) heating at a first temperature a substantially dry (i.e., substantially free of water and liquid hydrocarbons) spent hydrotreating catalyst composition comprising (i) an alumina-containing support material, (ii) at least one compound (generally oxide and/or sulfide) of at least one metal selected from the group consisting of molybdenum, tungsten, nickel and cobalt, and (iii) solid carbonaceous deposits, under such heating conditions as to substantially remove said solid carbonaceous deposits, and (b) heating the material obtained in step (a) at a second temperature, which is higher than said first temperature, under such conditions as to increase the average pore diameter of said material obtained in step (a) and to provide a regenerated (i.e., regenerated spent) hydrotreating catalyst.

In a particularly preferred embodiment, the temperature in step (a) is about 800°–1000° F., and the temperature in step (b) is about 1000°–1800° F. In another preferred embodiment, the regenerated hydrotreating catalyst obtained in step (b) has a pore distribution such that the volume of pores in the 60–300 Å (Angstroms) diameter range account for over 50% of the total pore volume of the regenerated catalyst. More preferably, the majority of the pores in the regenerated hydrotreating catalyst are in the 80–250 Å pore diameter range.

Also in accordance with this invention, there is provided a regenerated catalyst composition which has been prepared by the regeneration process comprising steps (a) and (b).

Further in accordance with this invention, there is provided a process for hydrotreating a liquid (i.e., liquid at the hydrotreating conditions) hydrocarbon containing feed, which also contains at least one metal impurity, comprising the step of contacting said feed with a free hydrogen containing gas and a regenerated hydrotreating catalyst composition, having been prepared by the regeneration process comprising steps (a) and (b), under such contacting conditions as to provide a liquid hydrocarbon containing product containing said at least one metal impurity (in particular compounds of nickel and/or vanadium) at a lower level than said feed.

BRIEF DESCRIPTION OF THE DRAWINGS

The FIGURE exhibits pore distribution curves for fresh and heat-treated spent hydrotreating catalyst compositions.

DETAILED DESCRIPTION OF THE INVENTION

The spent catalyst composition (also referred to as spent catalyst) used in steps (a) of the process of this invention can be any spent alumina-supported hydrotreating catalyst composition which comprises compound(s) of Mo and/or W and/or Ni and/or Co and has been used in a prior oil hydrotreating (preferably hydrodesulfurization) process under such conditions as to such form solid carbonaceous deposits (i.e., coke or coke-like deposits which may contain some hydrogen bound to carbon) on the catalyst composition.

Generally, the fresh catalyst composition (i.e. the catalyst composition prior to its use in said prior oil hydrotreating process), from which the spent hydrotreating catalyst composition is derived, comprises the following parameters: a surface area SA (as determined by the B.E.T. method using nitrogen; carried out substantially in accordance with ASTM method D3037) of about 50 to about 400 $m^2/g$, preferably about 150 to about 350 $m^2/g$; a pore volume PV (as determined by mercury intrusion porosimetry; carried out at room temperature and a mercury pressure ranging from an initial pressure of 0 psig to a final pressure of 60,000 psi, using an Autopore 9200 instrument of Micromeritics, Norcross, GA) of about 0.2 to about 1.5 cc/g, preferably about 0.4 to about 1.0 cc/g; and an average pore diameter PD (calculated from the formula $PD = 4 \times PV \div SA$) of less than 100 Å, preferably about 30 to about 100 Å, more preferably about 50 Å to about 80 Å. Generally the fresh catalyst composition contains a total of about 5 to about 20 weight percent promoter metal (i.e., Mo and/or W and/or Ni and/or Co), preferably about 2 to about 15 weight percent Mo (more preferably about 5–10 weight percent Mo), preferably about 1 to about 10 weight percent Ni (more preferably about 2–6 weight percent Ni), and preferably about 1 to about 10 weight percent Co (more preferably about 2–6 weight percent Co). Preferably, Pt, Pd and other Group VIII noble metals and compounds thereof are essentially absent from the catalyst composition. However, it is within the scope of this invention to have additional promoteres present in the hydrotreating catalyst, e.g., compounds of Y, La, Ce, Ti, Zr, V, Cr, Mn, Re, Fe, Cu, Zn, P, B and the like.

The spent hydrotreating catalyst composition, derived from the above-described fresh catalyst composition and used as starting material in step (a), generally exhibits a lower surface area, a lower pore volume and a lower average pore diameter than the fresh hydrotreating catalyst. Specific ranges of surface area, pore volume and average pore diameter greatly of the spent hydrotreating catalyst depend on the type of previous hydrotreating, the severity of previous hydrotreating conditions, and the types and levels of contaminants in the feed used in the prior hydrotreating in which the catalyst was used. The weight percentage of W and/or Mo and/or Ni and/or Co in the spent catalyst (excluding the weight of carbonaceous deposits) is about the same as in the fresh catalyst. However, the Ni content in the spent catalyst can be significantly higher, such as about 5–20 weight-% Ni, if the hydrotreating feed contained relatively high levels of Ni contaminants. Furthermore, the spent catalyst can also contain compounds of vanadium and iron. The weight ratio of carbonaceous deposits on the spent catalyst composition to the sum of components (i) and (ii) of the spent catalyst composition can be in the range of from about 1:1000 to about 1:1, preferably about 1:100 to about 1:10.

Step (a) is carried out with a substantially dry, oil-free spent catalyst composition. The removal of liquids (hydrocarbons, water, solvents and the like) from the spent catalyst before step (a) can be carried out by any conventional drying means under any suitable conditions, such as heating in a substantially inert gas stream (e.g., $N_2$, He, Ar, methane, ethane, and the like), so as to evaporate and sweep away adhered liquids from the spent catalyst composition; or by pumping off adhered liquids under reduced pressure conditions; or by washing adhered liquids from the spent catalyst with a suitable solvent, followed by pumping under reduced pressure conditions (so as to remove adhered solvent); and the like. The spent hydrotreating catalyst composition should be substantially free of flammable organic materials, before step (a) is carried out.

Heating step (a) be carried out under any suitable conditions which result in the removal of carbonaceous deposits and generally also in a conversion of metal sulfides (e.g., sulfides of Ni, V, etc.) to metal oxides. Generally, the temperature in step (a), labeled first temperature, is in the range of from about 700° to about 1000° F., preferably about 800° to about 950° F. The heating time can vary considerably depending on the temperature of heating step (a) and on the amount of carbonaceous deposits to be removed. Heating step (a) generally is carried out in under oxidizing conditions, preferably in a free oxygen containing gas, such as air or nitrogen-diluted air, so as to oxidize the carbonaceous deposits to carbon oxides ($CO_2$ and/or CO) and to substantially convert metal sulfides to metal oxides. Generally, heating step (a) is terminated when the amount of carbon oxides (CO and/or $CO_2$) in the off-gas is low enough to indicate that essentially all carbonaceous deposits have been burned off.

The product obtained in step (a) generally has the following parameters (determined as described above): a surface area in the range of from about 50 to about 300 $m^2/g$ (preferably about 100–200 $m^2/g$), a pore volume in the range of from about 0.2 to about 1.0 cc/g (preferably about 0.4–0.6 cc/g), an average pore diameter in the range of about 40 to about 150 Å (preferably about 60–100 Å), and a pore volume in pores of 60–300 Å diameter in the range of from about 40 to about 90 percent (preferably about 60–80 percent) of the total pore volume.

Heating step (b) is carried out at a temperature, labeled second temperature, which is higher than the temperature of step (a). Generally, the temperature step (b) is in the range of from about 1000° to about 1800° F., preferably about 1100°–1700° F., more preferably about 1200°–1500° F. The heating time of step (b) depends on the temperature but generally is in the range of about 10 minutes to about 24 hours (preferably about 1–5 hours). The heating (calcining) step (b) can be carried out in an inert gas atmosphere or in an oxidizing gas atmosphere. Preferably, heating step (b) is carried out in a free oxygen containing gas atmosphere (such as air).

The regenerated spent catalyst composition obtained in step (b) generally has the following parameters (determined as described above): a surface area in the range of about 20 to about 200 $m^2/g$ (preferably about 40–150 $m^2/g$); a pore volume in the range of about 0.2 to about 0.8 cc/g (preferably about 0.4–0.6 cc/g); an average pore diameter in the range of about 50 to about 200 Å (preferably about 80–120 Å), and a percentage of pores of 60–300 Å diameter in the range of about 50 to about 90 percent (preferably about 65–85 percent) of the total pore volume. Alumina and metal promoter weight percentages of the regenerated spent catalyst are approximately the same as in the unregenerated spent catalyst composition (based on its weight excluding the weight of carbonaceous deposits), as recited above.

The regenerated spent catalyst composition can be employed as a catalyst composition in a variety of hydrocarbon conversion processes, but is particularly suited as a catalyst composition in hydrofining processes employing metal-containing hydrocarbon-containing feed oils. In one preferred embodiment of this invention the regenerated spent catalyst composition of this invention is used as a catalyst for hydrotreating substantially liquid hydrocarbon-containing feed streams, which also contain compounds (mainly organic compounds) of nickel and/or vanadium and sulfur as impurities, and generally also coke precursors (measured as Ramsbottom carbon residue, ASTM D524) and nitrogen compounds. Suitable hydrocarbon containing feed streams include crude oils and fractions thereof, petroleum products, heavy oil extracts, coal pyrolyzates, liquefied coal products, products from tar sands, shale oil and shale oil products. The regenerated spent catalyst composition is particularly suited for treating heavy topped crudes (heavy oil residua) which generally have an initial boiling point (measured under atmospheric pressure) in excess of about 400° F., preferably in excess of about 600° F., containing about 5–1000 ppmw (parts by weight per million parts by weight of hydrocarbon-containing feed) vanadium, about 3–500 ppmw nickel, about 0.5–7.0 weight-% sulfur, about 0.2–2.0 weight-% nitrogen and about 1–30 weight-% Ramsbottom carbon residue, and having an API gravity (measured at 60° F.) of about 5–25.

The hydrotreating process of this invention employing the regenerated spent catalyst composition of this invention can be carried out in any apparatus whereby an intimate contact of the regenerated catalyst composition with the hydrocarbon-containing feed stream and a free hydrogen containing gas is achieved, under such conditions as to produce a hydrocarbon containing product having reduced levels of nickel and/or vanadium and sulfur. Generally, a lower level of nitrogen and Ramsbottom carbon residue and higher API gravity are also attained in this hydrotreating process. The hydrotreating process can be carried out using a fixed catalyst bed (presently preferred) or a fluidized catalyst bed or a moving catalyst bed or an agitated slurry of the regenerated catalyst in the oil feed (hydrovisbreaking operation). The hydrotreating process can be carried out as a batch process or, preferably, as a continuous process, more preferably in a tubular reactor containing at least one fixed regenerated catalyst bed or in a plurality of fixed bed reactors in parallel or in series. The hydrocarbon-containing product stream can be distilled, e.g., in a fractional distillation unit, so as to obtain product fractions having different boiling ranges.

The regenerated spent catalyst composition of this invention can be used alone in the hydrotreating process of this invention, or it can be used in combination with substantially unpromoted refractory materials, such as alumina, silica, titania, magnesia, metal silicates, metal aluminates, titania and metal phosphates. Alternating layers of the refractory material and the regenerated catalyst composition can be used, or the catalyst composition can be mixed with the refractory material with the regenerated catalyst composition for better dispersion of the hydrocarbon-containing feed stream.

Fresh hydrotreating catalysts (e.g., $NiO/MoO_3$, $CoO/MoO_3$, $NiO/CoO/MoO_3$, $NiO/MoO_3/TiO_2$, and the like, all supported on alumina containing materials) can be used in admixture with the regenerated catalyst composition of this invention to achieve simultaneous demetallization, desulfurization, denitrogenation and hydrocracking, if desired. It is also within the scope of this invention, to use a layer of the regenerated catalyst composition of this invention and one or more layers of fresh hydrotreating catalysts in one reactor (stacked catalyst beds), or to use a reactor containing the regenerated catalyst invention in conjunction with one or more reactors in series containing a fresh hydrotreating catalyst, so as to achieve the simultaneous hydrotreating results recited above. Preferably, the regenerated spent catalyst composition of this invention is used in a top layer and/or in the first reactor, resPectively, so as to serve primarily as demetallizing catalyst.

Any suitable reaction time (contact time) between the regenerated spent catalyst composition, the hydrocarbon-containing feed stream and hydrogen gas can be utilized. In general, the reaction time will range from about 0.05 hours to about 10 hours, preferably from about 0.4 to about 5 hours. In a continuous fixed bed operation, this generally requires a total liquid hourly space velocity (LHSV; expressed as volume feed per volume catalyst per hour) in the range of about 0.10 to about 10, preferably a LHSV of about 0.2 to about 0.5.

The hydrotreating process employing the regenerated spent catalyst composition of the present invention can be carried out at any suitable temperature. The temperature will generally be in the range of about 250° C. to about 550° C., and will preferably be in the range of about 300° C. to about 450° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature.

Any suitable pressure may be utilized in the hydrotreating process of this invention. The reaction pressure will generally be in the range of about atmospherIc pressure (0 psig) to about 5,000 psig. Preferably, the pressure will be in the range of about 100 to about 2500 psig. Higher pressures tend to reduce coke formation, but operating at high pressure may be undesirable for safety and economic reasons.

Any suitable quantity of hydrogen can be added to the hydrotreating process of this invention. The quantity of hydrogen used to contact the hydrocarbon containing feed stock will generally be in the range of about 100 to about 10,000 SCFB (standard cubic feed $H_2$ per barrel of the hydrocarbon containing feed stream), and will more preferably be in the range of about 1,000 to about 6,000 SCFB. Either substantially pure hydrogen or a free hydrogen containing gas mixture (e.g., $H_2$ and $CH_4$, or $H_2$ and CO, or $H_2$ and $N_2$) can be used.

In general, the regenerated spent catalyst composition is utilized primarily for demetallization and desulfurization in the hydrotreating process process of this invention. The time in which the catalyst composition of this invention will maintain its activity for the above process will depend upon the hydrotreating conditions and the contaminant levels of the hydrocarbon containing feed. Generally, the temperature of the hydrotreating process is gradually increased to compensate for loss of catalyst activity due to fouling (e.g., due to deposition of coke and metals on the catalyst). The regenerated spent catalyst can, if desired, be regenerated again when its activity has dropped below a desired level. Catalyst regeneration can be carried out by the regeneration process of this invention or by other suitable (preferably oxidative) regeneration methods.

At least a portion of the hydrotreated product stream of this invention can subsequently be cracked, e.g., in a fluidized catalytic cracking unit, under such conditions as to produce lower boiling hydrocarbon materials suitable for use as fuels and other useful products. It is within the scope of this invention to hydrotreat the product stream having reduced contents of metals and sulfur in a process using a different catalyst composition (such as alumina-supported $NiO/MoO_3$ or $CoO/MoO_3$ catalysts) having a smaller average pore diameter than the regenerated spent catalyst of this invention) for further removal of sulfur and other impurities before the product stream is introduced into a cracking reactor and treated under cracking conditions.

The following examples are presented in further illustration of the invention and are not to be considered as unduly limiting the scope of this invention.

EXAMPLE I

This example illustrates the regeneration of a spent hydrotreating catalyst.

A sample of a commercial hydrofining catalyst (a Co/Mo-promoted alumina catalyst; labeled catalyst "X"), which had been used in a commercial oil hydrotreater of a refinery of Phillips Petroleum Company (primarily for removal of sulfur from the oil) and had been discarded when its desulfurization activity had dropped below an acceptable level, was solvent-extracted with toluene, washed with n-pentane and dried in a vacuum oven for 2 hours (to remove adhered oil and solvent therefrom). The dried spent catalyst was then heated for 4 hours at 900° F. in a gas stream of 95 volume-% $N_2$ and 5 volume-% $O_2$ (so as to burn off coke deposits). The thus calcined spent catalyst composition had the following Properties: Co content of 2-3 weight-%, Mo content of 6-7 weight-%, Ni content of 1.4 weight-%, V content of 1.6 weight-%; surface area (SA; determined by the BET method using $N_2$) of 139 m$^2$/g, pore volume (PV; determined by mercury porosimetry) of 0.42 cc/g, average pore diameter ($4 \times PV \div SA$) of 80 Å, and a density of 0.78 g/cc. By comparison, fresh catalyst "X" has a BET/$N_2$ surface area of 280-290 m$^2$/g, a pore volume of 0.45-0.55 cc/g, and an average pore diameter of about 60-65 Å. The pore distribution of a sample of fresh catalyst "X" and of the spent catalyst, which had been dried and calcined at 900° F. (as described above), are shown in the FIGURE.

The spent catalyst "X" which had been dried and heated at 900° F. was subsequently calcined in air for about 3 hours at 1300° F. The thus calcined and regenerated catalyst had the following properties: BET/$N_2$ surface area 51 m$^2$/g, pore volume of 0.50 m$^2$/g, average pore diameter of 97 Å, and density of 0.82 m$^2$/g. The pore distribution of the regenerated catalyst (after calcination at 1300° F.) is also shown in FIGURE I.

The pore distribution curves in FIG. 1 and the pore properties described above indicate that the regeneration process of this invention resulted in a shift toward larger pores, especially those in the 60–300 Å range, and thus in a substantial increase of the average pore diameter. Since hydrotreating catalysts having the majority of its pores in the 60–300 Å range are very effective hydrodemetallization catalysts, it is concluded that the regenerated catalyst "X" (calcined at 900° F. and then at 1300° F.) will exhibit high hydrodemetalization activity.

EXAMPLE II

This example illustrates the use of a regenerated, spent catalyst for hydrotreating a heavy oil. A sample of a catalyst composition comprising spent catalyst "X" (prepared by grinding an oil-free, dried spent catalyst "X" which contained coke deposits, mixing the ground spent catalyst with a viscous, aqueous alumina slurry, extruding the paste of spent "X"/alumina, drying the extrudate, calcining it at 900° F. and then at 1300° F.) was employed in a lab scale trickle bed hydrotreating reactor. A heavy feedstock (Maya 400F+ residuum) which contained 64 ppmw (parts by weight per million parts by weight of feed) Ni, about 320 ppmw V, 3.9 weight-% sulfur, 14 weight-% and Ramsbottom carbon residue, and had an API gravity (measured at 60° F.) of about 14, was mixed with hydrogen gas and pumped downwardly through a heated, stainless steel trickle bed reactor (28–29 inches long, 0.75 inch inner diameter; fitted inside with a 0.25 inch axial thermocouple). The reactor was filled with a 9 inch high top layer of Alundum ® ($\alpha$-alumina having a surface area of less than 1 m$^2$/g), a middle layer (about 13 inches high) of a mixture of 30 cc (12.4 grams) of the above-described catalyst composition and 60 cc (125 g) Alundum ®; and a 4 inch high bottom layer of Alundum ®. The liquid hydrotreated product was separated from gases collected in an accumulator and analyzed. Nickel and vanadium contents were measured by plasma emission analysis, sulfur content was measured by X-ray fluorescence spectrometry, and Ramsbottom carbon residue was measured in accordance with ASTM D524.

An accelerated hydrotreating test was carried out for about 6 weeks at about 750° F., 2250 psig total pressure, oil feed rate (LHSV) of 1.67 cc oil per cc of the above-described catalyst composition per hour, and a hydrogen feed rate of 3500 SCFB (standard cubic feet per barrel oil). During the first 10 days of the test run, the average removal of metals (Ni+V) was about 66%, and the average removal of sulfur was about 31%. At the end of the run (i.e., after about 5–6 weeks on stream), the average removal of metals was still about 63%, whereas the average sulfur removal had dropped to about 25%.

Based on these test results, it is concluded that a regenerated spent catalyst "X" whIch is prepared by the regeneration method of this invention (e.g., by the procedure described in Example I) is also quite effective as a hydrodemetallization catalyst.

Reasonable variations, modifications and adaptations for various usages and conditions can be made within the scope of the disclosure and the appended claims, without departing from the scope of this invention.

What is claimed is:

1. A process for regenerating a spent hydrotreating catalyst composition comprising the steps of
   (a) heating at a temperature in the range of from about 700° to about 1000° F. a substantially dry spent hydrotreating catalyst composition comprising (i) an alumina-containing support material, (ii) at least one compound of at least one metal selected from the group consisting of molybdenum, tungsten, nickel, and cobalt, and (iii) solid carbonaceous deposits, under such heating conditions as to substantially remove said solid carbonaceous deposits, and
   (b) heating the material obtained in step (a) at a temperature in the range of from about 1100° to about 1700° F., under such conditions as to increase the average pore diameter of said material obtained in step (a) and to provide a regenerated hydrotreating catalyst composition.

2. A process in accordance with claim 1, wherein said heating in step (a) is carried out in a free oxygen containing gas atmosphere.

3. A process in accordance with claim 1, wherein the weight ratio of component (iii) to the sum of components (i) and (ii) in said substantially dry spent hydrotreating catalyst composition, used in step (a), is in the range of from about 1:1000 to about 1:1.

4. A process in accordance with claim 1, wherein said substantially dry spent hydrotreating catalyst composition, excluding said carbonaceous deposits, comprises about 5 to about 20 weight percent of said at least one metal.

5. A process in accordance with claim 1, wherein said material obtained in step (a) has a surface area in the range of from about 50 to about 300 m$^2$/g, a pore volume in the range of from about 0.2 to about 1.0 cc/g, and an average pore diameter in the range of from about 40 to about 150 Å.

6. A process in accordance with claim 1, wherein step (b) is carried out at a temperature of about 1200° to about 1500° F. for about 1 to about 5 hours.

7. A process in accordance with claim 1, wherein said regenerated hydrotreating catalyst composition, obtained in step (b), has a surface area in the range of from about 20 to about 200 m$^2$/g, a pore volume in the range of from about 0.2 to about 0.8 cc/g, and an average pore diameter in the range of from about 50 to about 200 Å.

8. A process in accordance with claim 7, wherein in said regenerated hydrotreating catalyst composition the volume of pores in the 60–300 Å diameter range accounts for over 50% of the total pore volume.

9. A process in accordance with claim 1, wherein said regenerated hydrotreating catalyst composition comprises about 2–5 weight-% Mo, about 2–20 weight-% Ni and about 1–10 weight-% Co.

10. A process in accordance with claim 1, wherein platinum, palladium and compounds thereof are substantially absent from said spent hydrotreating catalyst composition.

11. A process for regenerating a spent hydrotreating catalyst composition comprising the steps of
   (a) heating at a temperature in the range of from about 700° to about 1000° F. a substantially dry spent hydrotreating catalyst composition comprising (i) alumina as support material, (ii) at least one compound of at least one metal selected from the group consisting of molybdenum, tungsten, nickel and cobalt, and (iii) solid carbonaceous deposits, under such heating conditions as to substantially remove said solid carbonaceous deposits, and
   (b) heating the material obtained in step (a) at a temperature in the range of from about 1100° F. to about 1700° F., under such conditions as to increase the average pore diameter of said material obtained in step (a) and to provide a regenerated hydrotreating catalyst composition.

12. A process in accordance with claim 11, wherein said heating in step (a) is carried out in a free oxygen containing gas atmosphere.

13. A process in accordance with claim 11, wherein the weight ratio of component (iii) to the sum of components (i) and (ii) in said substantially dry spent hydrotreating catalyst composition, used in step (a), is in the range of from about 1:1000 to about 1:1.

14. A process in accordance with claim 11, wherein said substantially dry spent hydrotreating catalyst composition, excluding said carbonaceous deposits, comprises about 5 to about 20 weight percent of said at least one metal.

15. A process in accordance with claim 11, wherein said material obtained in step (a) has a surface area in the range of from about 50 to about 300 m²/g, a pore volume in the range of from about 0.2 to about 1.0 cc/g, and an average pore diameter in the range of from about 40 to about 150 Å.

16. A process in accordance with claim 11, wherein step (b) is carried out at a temperature of about 1,200° to about 1,500° F.

17. A process in accordance with claim 16, wherein step (b) is carried out for about 1 to about 5 hours.

18. A process in accordance with claim 11, wherein said regenerated hydrotreating catalyst, obtained in step (b), has a surface area in the range of from about 20 to about 200 m²/g, a pore volume in the range of from about 0.2 to about 0.8 cc/g, and an average pore diameter in the range of from about 50 to about 200 Å.

19. A process in accordance with claim 18, wherein said surface area is in the range of from about 40 to about 150 m²/g, and said pore volume is in the range of from about 0.4 to about 0.6 cc/g.

20. A process in accordance with claim 18, wherein said average pore diameter is in the range of from about 80 to about 120 Å.

21. A process in accordance with claim 18, wherein in said regenerated hydrotreating catalyst composition the volume of pores in the 60-300 Å diameter range accounts for over 50% of the total pore volume.

22. A process in accordance with claim 21, wherein said volume of pores in the 60-300 Å diameter range accounts for over 65 to about 85 percent of the total pore volume.

23. A process in accordance with claim 11, wherein said regenerated hydrotreating catalyst composition comprises about 2-15 weight-% Mo, about 2-20 weight-% Ni and about 1-10 weight-% Co.

24. A process in accordance with claim 11, wherein platinum, palladium and compounds thereof are substantially absent from said spent hydrotreating catalyst composition.

25. A process in accordance with claim 11, wherein component (ii) of said spent hydrotreating catalyst composition is at least one metal oxide selected from the group consisting of $MoO_3$, NiO and CoO.

26. A process in accordance with claim 25, wherein said component (ii) is a mixture of $MoO_3$ and NiO.

27. A process in accordance with claim 25, wherein said component (ii) is a mixture of $MoO_3$ and CoO.

28. A process in accordance with claim 25, wherein said component (ii) is a mixture of $MoO_3$, NiO and CoO.

29. A process in accordance with claim 11, wherein said spent hydrotreating catalyst composition consists essentially of (i) alumina, (ii) at least one compound of at least one metal selected from the group consisting of Mo, W, Ni, and Co, and at least one compound of at least one element selected from the group consisting of Y, La, Ce, Ti, Zr, V, Cr, Mn, Re, Fe, Cu, Zn, P and B, and (iii) solid carbonaceous deposits.

30. A process in accordance with claim 29, wherein component (ii) consists essentially of $MoO_3$, NiO and $TiO_2$.

* * * * *

UNITED STATES PATENT AND TRADEMARK OFFICE
CERTIFICATE OF CORRECTION

PATENT NO. : 4,975,399
DATED : December 4, 1990
INVENTOR(S) : Lloyd E. Gardner

It is certified that error appears in the above-identified patent and that said Letters Patent is hereby corrected as shown below:

Claim 9, column 8, line 63, delete "2-5" and substitute --- 2-15 --- therefor.

Signed and Sealed this

Thirty-first Day of March, 1992

Attest:

HARRY F. MANBECK, JR.

*Attesting Officer*  *Commissioner of Patents and Trademarks*